United States Patent [19]

Suzuki et al.

[11] Patent Number: 4,474,483

[45] Date of Patent: Oct. 2, 1984

[54] HYDROSTATIC BEARING APPARATUS WITH A COOLING FUNCTION

[75] Inventors: Hiroshi Suzuki, Okazaki; Akira Tsuboi, Kariya; Kazuhiko Sugita, Anjoh, all of Japan

[73] Assignee: Toyoda Koki Kabushiki Kaisha, Kariya, Japan

[21] Appl. No.: 475,644

[22] Filed: Mar. 15, 1983

[30] Foreign Application Priority Data

Mar. 29, 1982 [JP] Japan .................................. 57-49041
Mar. 29, 1982 [JP] Japan .................................. 57-43248

[51] Int. Cl.³ .................... F16C 32/06; F16C 37/00; F16C 33/10
[52] U.S. Cl. .................................. 384/114; 384/100; 384/118; 384/313; 384/316
[58] Field of Search .............. 384/100, 114, 118, 120, 384/313, 316, 317, 397, 398, 399, 400, 900

[56] References Cited

U.S. PATENT DOCUMENTS

| | | | |
|---|---|---|---|
| 1,108,761 | 8/1914 | Kieser | 384/316 |
| 2,660,485 | 11/1953 | Gerard | 384/118 |
| 3,685,874 | 8/1972 | Gerard | 384/114 |
| 4,046,223 | 9/1977 | McHugh | 384/313 X |
| 4,285,551 | 8/1981 | Suzuki et al. | 384/100 |

FOREIGN PATENT DOCUMENTS 10851 1/1979 Japan .................................. 384/100

Primary Examiner—Stuart S. Levy
Assistant Examiner—Thomas R. Hannon
Attorney, Agent, or Firm—Oblon, Fisher, Spivak, McClelland & Maier

[57] ABSTRACT

In a hydrostatic bearing apparatus, a bearing bushing is formed at its internal surface with a plurality of circumferentially separate fluid pockets, into which pressurized fluid is conducted via respective throttle elements for rotatably supporting a spindle received in the internal surface, by means of static pressure generated in each of the fluid pockets. The bearing surface is further formed with a plurality of exhaust grooves, each of which extends in the axial direction of the bearing bushing between contiguous two of the fluid pockets. Pressurized fluid cooled by a cooler device is supplied to flow along the exhaust grooves in the axial direction of the bearing bushing, so that heated pressurized fluid in each fluid pocket is prevented from being carried by rotation of the spindle into another fluid pocket circumferentially next thereto. Further, a plurality of axial through holes are formed in the bearing bushing, and a pair of annular cap members are respectively secured to axial opposite ends of the bearing bushing. The annular cap members are formed at their inner end surfaces with a plurality of arcuate elongated holes, which make the axial through holes communicate in series. Pressurized fluid cooled by the cooler device is conducted to pass through the through holes for heat exchange with the bearing bushing.

9 Claims, 5 Drawing Figures

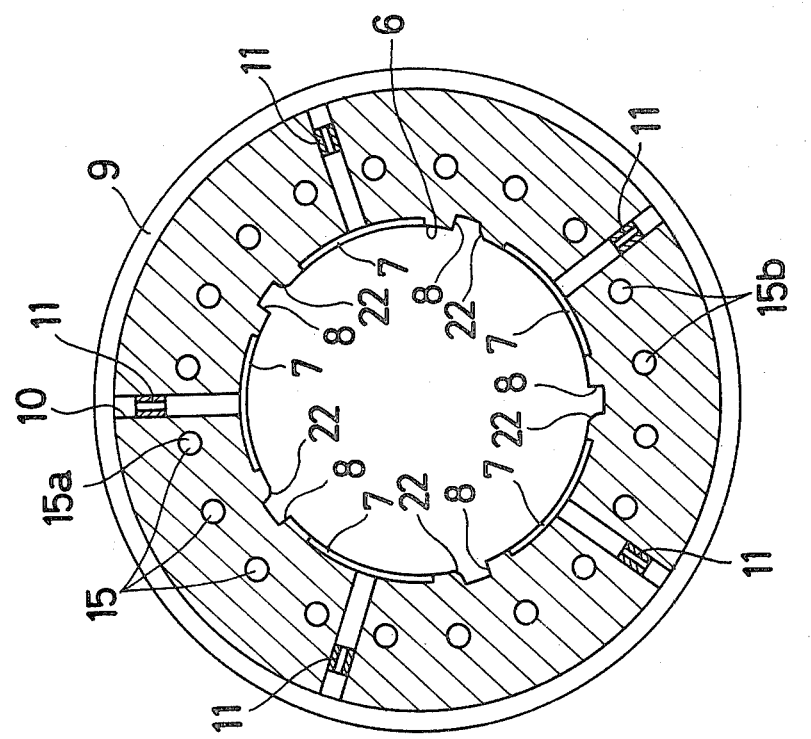

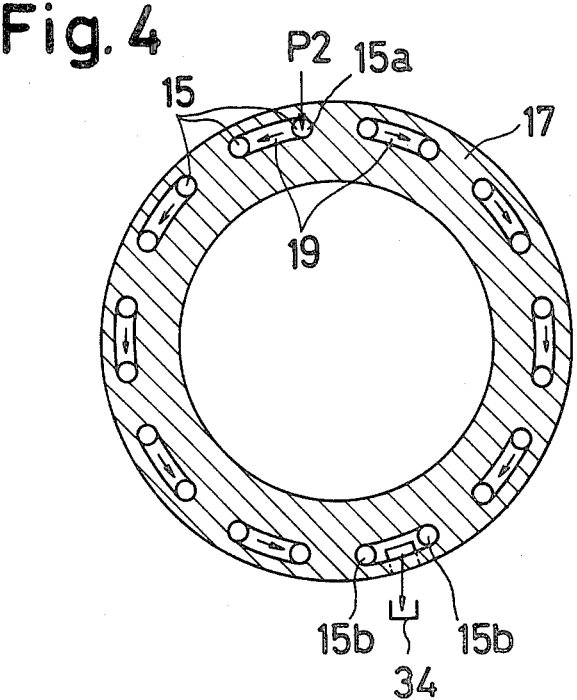
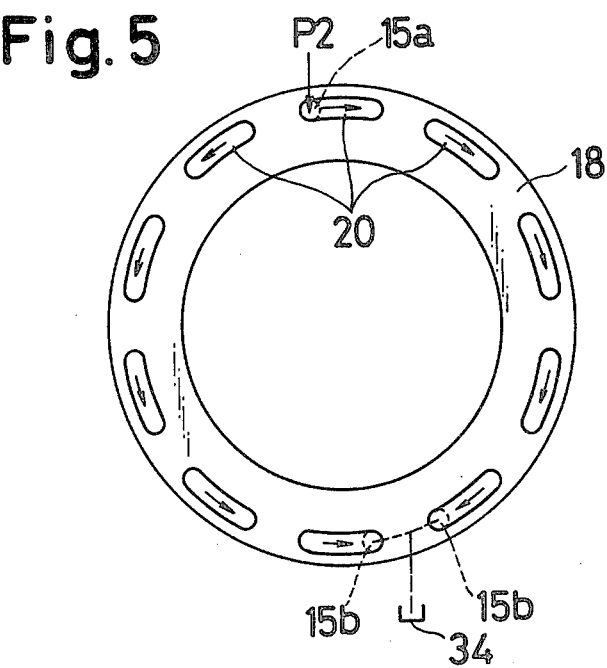

HYDROSTATIC BEARING APPARATUS WITH A COOLING FUNCTION

BACKGROUND OF THE INVENTION

1. Field of the Invention

The present invention relates to a hydrostatic bearing apparatus for rotatably supporting a spindle by means of hydrostatic pressure generated in fluid pockets formed at an internal surface of a bearing bushing.

2. Description of the Prior Art

In a known hydrostatic bearing, pressurized fluid is supplied via respective throttle elements to fluid pockets which are circumferentially formed at an internal surface of a bearing bushing, and a spindle received in the bearing bushing is rotatably carried by means of hydrostatic pressure generated in each of the fluid pockets. The rotation of the spindle causes pressurized fluid in each fluid pocket to circumferentially flow as a result of being involved by the outer circumferential surface of the spindle. Thus, heated pressurized fluid in each fluid pocket flows therefrom into another fluid pocket next thereto at the downstream side in the rotational direction of the spindle. This phenomenon is called "carry-over". The "carry-over" phenomenon takes place not only in a hydrostatic bearing which has no exhaust groove between every two circumferentially successive fluid pockets, but also in another hydrostatic bearing which has an exhaust groove between every two circumferentially successive fluid pockets.

That is, the exhaust groove is filled with heated fluid which overflows a fluid pocket located at the upstream side in the spindle rotational direction. The rotation of the spindle thus causes the heated fluid to flow from each fluid pocket to another fluid pocket next thereto at the downstream side of the spindle rotational direction. The pocket-to-pocket flow of the heated fluid is repeated, whereby the generation of heat is facilitated.

Generally, the fluid pockets are supplied with pressurized fluid through respective throttle elements. Pressure loss caused by the throttle elements is converted into thermal energy. In addition, rotation of the spindle is accompanied by fluid friction, which results in heat generation. In an ideal state wherein no "carry-over" phenomenon takes place, the temperature of the bearing hardly increases since heated pressurized fluid is completely discharged from the fluid pockets outside the bearing and after cooled off by a cooler device, is supplied again from a fluid pump to the fluid pockets. In a state wherein the "carry-over" phenomenon takes place, on the other hand, pressurized fluid once heated by experiencing the "carry-over" flow is again heated in another fluid pocket to expedite an temperature increase at the fluid pocket even where thermally controlled fresh fluid is supplied to the fluid pockets.

Such temperature increase causes thermal expansion of the spindle, the bearing bushing and the bearing housing and leads to machining error caused by thermal deformation of these machine tool components. Such machining errors resulting from heat generation still remain as a major problem to be solved in a hydrostatic bearing for precision machine tools.

To solve these drawbacks, a known fluid bearing is provided in a bearing housing thereof with a water jacket designed to diminish the temperature increase of a bearing bushing thereof. However, the provision of the water jacket is not effective to prevent heat generation at the internal surface of the bearing bushing and raises a difficulty in designing down-sized hydrostatic bearings.

SUMMARY OF THE INVENTION

Accordingly, it is a primary object of the present invention to provide an improved hydrostatic bearing apparatus capable of restraining heat generation at the internal surface of a bearing bushing thereof.

Another object of the present invention is to provide an improved hydrostatic bearing apparatus wherein heated fluid discharged from each fluid pocket is prevented from flowing into another fluid pocket circumferentially next thereto, so that accelerative heat generation caused by the repetition of pocket-to-pocket flow of heated fluid can be avoided.

Another object of the present invention is to provide an improved hydrostatic bearing apparatus wherein the carry-over flow of heated fluid from each fluid pocket to another fluid pocket circumferentialy next thereto is prevented by positively permitting the carry-over flow of cooled fluid into the latter fluid pocket.

A further object of the present invention is to provide an improved hydrostatic bearing apparatus wherein heat exchange is carried out in the vicinity of a heat generating area.

A still further object of the present invention is to provide an improved hydrostatic bearing apparatus incorporating a heat exchange arrangement which is effective to restrain temperature increase of a bearing bushing thereof and which does not impose substantial limitation on designing the hydrostatic bearing apparatus to a small size.

Briefly, according to the present invention, there is provided a hydrostatic bearing apparatus, which comprises a bearing housing, a bearing bushing mounted in the bearing housing and a spindle rotatably received in an internal surface of the bearing bushing. The bearing bushing is formed at its internal surface with a plurality of circumferentially separate fluid pockets and a plurality of exhaust grooves each extending substantially in the axial direction of the bearing bushing and between every contiguous two of the fluid pockets. The bearing apparatus further comprises a first fluid supply for supplying high-pressurized fluid to the fluid pockets, a second fluid supply for supplying low-pressurized fluid to the exhaust groove, and a cooler device for cooling the low-pressurized fluid supplied to the exhaust groove.

When the apparatus is in operation, the cooled low-pressurized fluid is filled in, and flows through the exhaust grooves to prevent heated high-pressurized fluid from being carried over by the rotation of the spindle from one of every contiguous two fluid pockets to the other fluid pocket. Thus, the heated high-pressurized fluid is positively discharged with the cooled low-pressurized fluid flowing along the exhaust grooves, whereby the generation of heat at the bearing surface can be restrained. Actually, a part of the cooled low-pressurized fluid in the exhaust grooves is involved by the rotation of the spindle to be carried over into the fluid pockets. This advantageously results in cooling the heated high-pressurized fluid in the fluid pockets.

In another aspect of the present invention, a hydrostatic bearing apparatus comprises a bearing bushing formed with a plurality of axially extending through passages therein, a pair of annular cap members respectively secured to axial opposite ends of the bearing bushing and formed therein with return passages serially connecting at least a part of the through passages, and a fluid supply for supplying low-pressurized fluid to flow the same through the serially connected part of the through passages. A cooler device is further provided for cooling the low-pressurized fluid supplied from the fluid supply. With this configuration, since cooled low-pressurized fluid is fed to serially pass through the part of the through passages, all the parts of the bearing bushing can be equally cooled off and even when thermally deformed, are equally deformed without affecting the rotational accuracy of a spindle. Particularly, the temperature increase of the bearing bushing can be effectively prevented because heat exchange is effected in the bearing bushing near the bearing surface. Further, the serial connection of the through passages by the pair of cap members makes it easy to provide fluid passages in the bearing bushing.

BRIEF DESCRIPTION OF THE ACCOMPANYING DRAWINGS

The foregoing and other objects and many of the attendant advantages of the present invention will be readily appreciated as the same becomes better understood by reference to a preferred embodiment of the present invention when considered in connection with the accompanying drawings, wherein like reference numerals designate identical or corresponding parts throughout the several views, and in which:

FIG. 2 is a sectional view of the apparatus taken along the line II—II in FIG. 1;

FIG. 3 is a sectional view of the apparatus taken along the line III—III in FIG. 1;

FIG. 4 is a sectional view of an annular cap member taken along the line IV—IV in FIG. 1; and FIG. 5 is a front view of another annular cap member as viewed along the line V—V in FIG. 1.

DETAILED DESCRIPTION OF A PREFERRED EMBODIMENT

Figure 1:
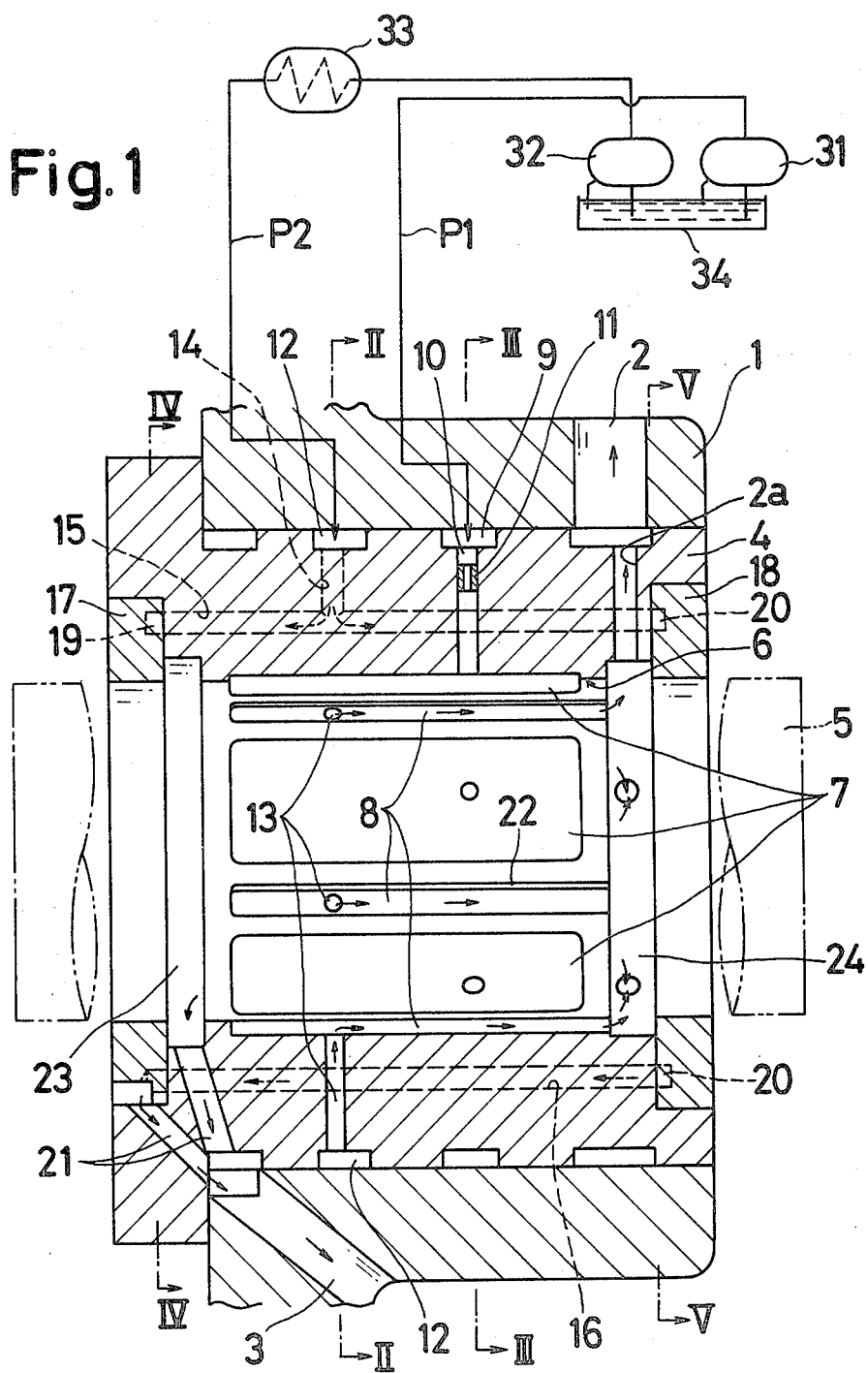
FIG. 1 is a cross-sectional view of a hydrostatic bearing apparatus according to the present invention.

Referring now to the drawings and particularly to FIG. 1 thereof, a hydrostatic bearing apparatus according to the present invention is shown having a bearing housing 1, which is formed with an upper drain port 2 and a lower drain port 3. A bearing bushing 4 is fixedly mounted in the bearing housing 1 and is provided with a bore, in which a spindle 5 is rotatably carried. An internal surface 6 of the bore is formed with a plurality of circumferentially separate fluid pockets 7 and a plurality of exhaust grooves 8. Each of the exhaust grooves 8 extends in the axial direction of the bearing bushing 4 between contiguous two of the fluid pockets 7. One axial end or the right end of each exhaust groove 8 is in fluid communication with an annular exhaust groove 24, which is formed at the right axial end portion of the internal surface 6 to in turn communicate with the upper drain port 2 through a radial passage 2a. As shown in FIGS. 2 and 3, each of the exhaust grooves 8 is further formed with a fluid conduction slant surface 22 at one of upper edges thereof which is ahead of the other upper edge in the rotational direction of the spindle 5. The slant surface 22 extends throughout at least the entire width of the fluid pockets 7 in the axial direction of the bearing bushing 4.

The bearing bushing 4 is formed at an outer circumferential surface thereof with a first annular inlet port 9 to receive high-pressurized fluid P1 from a first fluid supply 31. The annular inlet port 9 is in fluid communication with the fluid pockets 7 through respective first supply passages 10 each incorporating a throttle element 11 therein. The outer circumferential surface of the bearing bushing 4 is further formed with a second annular inlet port 12 to receive cooled low-pressurized fluid P2 from a second fluid supply 32 via a cooler device 33. The second annular inlet port 12 is in fluid communication with the exhaust grooves 8 through respective second supply passages 13. Preferably, a flow rate control orifice (not shown) may be provided in each of the second supply passages 13.

The bearing bushing 4 is further formed therein a plurality of through holes 15, which are arranged at equiangular intervals in the circumferential direction of the bearing bushing 4 to extend in the axial direction of the bearing bushing 4. A pair of annular end caps 17 and 18 are respectively fitted in, and secured to cap bores formed at axial opposite ends of the bearing bushing 4.

The annular end caps 17 and 18 are formed with a plurality of arcuate elongated holes 19 and 20 at respective inner end surfaces thereof, as best shown in FIGS. 4 and 5. These arcuate elongated holes 19 and 20 make all of the through holes 15 to communicate in series. As can be seen in FIGS. 1 and 2, one of the through holes 15 (hereafter referred to as "inlet through hole 15a") is in fluid communication with the second annular inlet port 12 through a radial passage 14, while two of the through holes 15 (hereafter referred to as "outlet through holes 15b") which are diametrically opposed with the inlet through hole 15a are in fluid communication with the lower drain port 3. Communication passages 21 are further formed in the bearing bushing 4 to lead to the lower drain port 3 fluid discharged from the two outlet through holes 15b and from another annular exhaust groove 23 formed at a left end of the bearing bushing 4.

In operation, high-pressurized fluid P1 of, e.g., 10 kg/cm$^2$ are supplied from the first fluid supply 31 to the first annular inlet port 9 at a flow rate of 10 l/min. and is conducted into the fluid pockets 7 via the throttle elements 11 fitted in the respective first supply passages 10. Hydrostatic pressure is thus generated in each fluid pocket 7, whereby the spindle 5 is rotatably supported without contacting the internal surface 6 of the bearing bushing 4.

Low-pressurized fluid P2 from the second fluid supply 32 is cooled off by passing through the cooler device 33 and is supplied to the second annular inlet port 12. Pressurized fluid P2 from the second fluid supply 32 has a pressure of 2 or 3 kg/cm$^2$ and a flow rate of 10 l/min., for example, and is lower in pressure than that conducted into the fluid pockets 7. Cooled low-pressurized fluid P2 is conducted via the respective second supply passages 13 into the exhaust grooves 8 each located between any contiguous two of the fluid pockets 7 and flows along the exhaust grooves 8. Cooled low-pressurized fluid P2 is conducted into the right annular exhaust groove 24 and is discharged through the radial passage 2a and the upper exhaust port 2 into a reservoir 34 constituting a part of each of the first and second fluid supplies 31 and 32. Accordingly, the exhaust grooves 8 are normally filled with low-pressurized fluid of a low temperature. This prevents heated pressurized fluid in each fluid pocket 7 from being conveied by rotation of the spindle 5 into another fluid pocket 7 which is ahead of said fluid pocket 7 in the rotational direction of the spindle 5. Instead, rotation of the spindle 5 causes a part of cooled low-pressurized fluid P2 flowing along the exhaust grooves 8 to be involved into a bearing clearance between the internal surface 6 of the bearing bushing 4 and the outer circumferential surface of the spindle 5 and then, to be flown into the fluid pockets 7. The carry-over flow of cooled low-pressurized fluid P2 into the fluid pockets 7 advantageously results in lowering the temperature at the fluid pockets 7.

Furthermore, a part of cooled low-pressurized fluid P2 supplied to the second annular inlet port 12 is conducted via the radial passage 14 into one of the through holes 15, namely into the inlet throughhole 15a. The fluid P2 conducted into the inlet through hole 15a is divided into two streams; one to flow through the left half of the through holes 15 in a counterclockwise direction and the other to flow through the right half of the through holes 15 in a clockwise direction, as viewed in FIG. 2. While flowing through the through holes 15b, the two streams of cooled low-pressurized fluid P2 effect heat exchange with the bearing bushing 4, whereby the same is cooled off. The two streams of cooled low-pressurized fluid P2 are respectively discharged from the two outlet through holes 15b which are diametrically opposed with the inlet through hole 15a and are corrected into the reservoir 34 via the communication passage 21 and the lower exhaust port 3. The bearing housing 1 in this particular embodiment constitutes the reservoir 34.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydrostatic bearing apparatus comprising:
   a bearing housing;
   a bearing bushing fixedly mounted in said bearing housing and formed at an internal surface thereof with a plurality of circumferentially separate fluid pockets and a plurality of exhaust grooves, each of said exhaust grooves extending in the axial direction of said bearing bushing and between contiguous two of said fluid pockets in the circumferential direction of said bearing bushing;
   a spindle rotatably recieved in said internal surface of said bearing bushing;
   a plurality of throttle elements respectively in fluid communication with said fluid pockets;
   fluid supply means in fluid communication with said throttle elements and said exhaust grooves for supplying pressurized fluid to said fluid pockets and said exhaust grooves; and
   a cooler device provided for cooling off pressurized fluid supplied from said fluid supply means to said exhaust grooves.

2. A hydrostatic bearing apparatus as set forth in claim 1, wherein:
   each of said exhaust grooves is formed with a slant surface at one of upper edges thereof which is ahead of the other upper edge thereof in the rotational direction of said spindle, for positively causing rotation of said spindle to conduct a part of pressurized fluid flowing along each of said exhaust grooves into one of said fluid pockets which is ahead of said each of said exhaust grooves in the rotational direction of said spindle.

3. A hydrostatic bearing apparatus as set forth in claim 2, wherein said fluid supply means includes:
   a first fluid supply for supplying pressurized fluid to said fluid pockets through said throttle elements; and
   a second fluid supply for supplying to said exhaust grooves pressurized fluid which is lower in pressure than that supplied to said fluid pockets.

4. A hydrostatic bearing apparatus as set forth in claim 3, wherein said bearing bushing is formed at said internal surface with a circumferential exhaust groove being in fluid communication with one axial end of each of said exhaust grooves, further comprising:
   exhaust port means provided above at least the axis of said bearing bushing and being in fluid communication with said circumferential exhaust groove.

5. A hydrostatic bearing apparatus as set forth in claim 1, wherein said bearing bushing is formed therein with a plurality of through holes extending in the axial direction of said bearing bushing and arranged in the circumferential direction of said bearing bushing, further comprising:
   a pair of annular cap members respectively secured to axial opposite ends of said bearing bushing and formed at inner end surfaces thereof with a plurality of elongated holes for making said through holes communicate in series;
   inlet passage means in fluid communication with one of said through holes for conducting pressurized fluid cooled by said cooler device into said one of said through holes; and
   outlet passage means in fluid communication with at least one other of said through holes and said fluid supply for returning said cooled pressurized fluid from said at least one other of said through holes to said fluid supply.

6. A hydrostatic bearing apparatus as set forth in claim 5, wherein:
   said outlet passage means is in fluid communication with said fluid supply and two of said through holes which are diametrically opposed with said one of said through holes for dividing said cooled pressurized fluid, conducted into said one of said through holes, into two streams one of which passes through a half of said through holes and the other of which passes through the remaining half of said through holes.

7. A hydrostatic bearing apparatus as set forth in claim 6, wherein said fluid supply means includes:
   a first fluid supply for supplying pressurized fluid to said fluid pockets through said throttle elements; and
   a second fluid supply for supplying pressurized fluid cooled by said cooler device to said one of said through holes, said pressurized fluid conducted into said one of said through holes being lower in pressure than that supplied to said fluid pockets.

8. A hydrostatic bearing apparatus comprising:
   a bearing housing;
   a bearing bushing fixedly mounted in said bearing housing and formed at an internal surface thereof with a plurality of circumferentially separate fluid pockets, said bearing bushing being further formed therein a plurality of through holes extending in the axial direction thereof and arranged in the circumferential direction thereof;

a spindle rotatably received in said internal surface of said bearing bushing;

a plurality of throttle elements respectively in fluid communication with said fluid pockets;

a pair of annular cap members respectively secured to axial opposite ends of said bearing bushing and formed at inner end surfaces thereof with a plurality of elongated holes for making said through holes communicate in series;

a first fluid supply in fluid communication with said throttle elements for supplying pressurized fluid to said fluid pockets through said throttle elements;

a second fluid supply in fluid communication with at least two of said through holes for supplying pressurized fluid so that the same passes through said through holes and is returned to said second fluid supply; and a cooler device for cooling said pressurized fluid supplied to pass through said through holes.

9. A hydrostatic bearing apparatus as set forth in claim 8, wherein:

said second fluid supply is in fluid communication with one of said through holes for supplying said pressurized fluid cooled by said cooler device to said one of said through holes and also in fluid communication with other two of said through holes for correcting said pressurized fluid discharged from said other two of said through holes.

* * * * *